United States Patent
Maharia

(10) Patent No.: US 10,243,838 B1
(45) Date of Patent: Mar. 26, 2019

(54) INTERLEAVING MEMBERS FOR PROPORTIONATE NETWORK TRAFFIC DISTRIBUTION

(71) Applicant: Juniper Networks, Inc., Sunnyvale, CA (US)

(72) Inventor: Rashmi Maharia, Sikar (IN)

(73) Assignee: Juniper Networks, Inc., Sunnyvale, CA (US)

(*) Notice: Subject to any disclaimer, the term of this patent is extended or adjusted under 35 U.S.C. 154(b) by 110 days.

(21) Appl. No.: 15/420,315

(22) Filed: Jan. 31, 2017

(51) Int. Cl.
*H04W 24/02* (2009.01)
*H04L 12/709* (2013.01)
*H04L 12/721* (2013.01)
*H04L 12/751* (2013.01)
*H04L 12/801* (2013.01)
*H04L 12/805* (2013.01)
*H04L 12/815* (2013.01)

(52) U.S. Cl.
CPC ............ *H04L 45/245* (2013.01); *H04L 45/44* (2013.01); *H04L 47/22* (2013.01); *H04L 45/02* (2013.01); *H04L 45/14* (2013.01); *H04L 47/34* (2013.01); *H04L 47/365* (2013.01); *H04W 24/02* (2013.01)

(58) Field of Classification Search
CPC ....... H04L 45/245; H04L 47/22; H04L 45/44; H04L 45/14; H04L 47/365; H04L 47/34; H04L 45/02; H04W 24/02
See application file for complete search history.

(56) References Cited

U.S. PATENT DOCUMENTS

| | | | | |
|---|---|---|---|---|
| 9,438,508 B1* | 9/2016 | Medved | ............ | H04L 41/12 |
| 9,712,447 B2* | 7/2017 | Wood | ............ | H04L 47/125 |
| 9,800,507 B2* | 10/2017 | Jiao | ............ | H04L 45/02 |
| 9,998,247 B1* | 6/2018 | Choudhury | ............ | H04J 3/0685 |
| 2012/0213218 A1* | 8/2012 | Yilmaz | ............ | H04L 45/02 370/351 |
| 2016/0087849 A1* | 3/2016 | Balasubramanian | ... | H04L 41/12 709/221 |
| 2016/0191391 A1* | 6/2016 | Wood | ............ | H04L 47/125 370/235 |
| 2016/0234578 A1* | 8/2016 | Sareen | ............ | H04Q 11/0062 |
| 2017/0085467 A1* | 3/2017 | Ford | ............ | H04L 45/245 |

OTHER PUBLICATIONS

Wikipedia, "Link aggregation," https://en.wikipedia.org/wiki/Link_aggregation, Jan. 30, 2017, 8 pages.

* cited by examiner

*Primary Examiner* — Brian T O Connor
(74) *Attorney, Agent, or Firm* — Harrity & Harrity, LLP

(57) ABSTRACT

A network device may receive information associated with a set of member links of the network device. The network device may determine a set of weight values, for the set of member links, based on the information associated with the set of member links. The network device may determine a set of multiplier values, for the set of member links, based on the set of weight values. The network device may generate a set of multiplier tables, for the set of member links, based on the set of multiplier values. The network device may generate an allocation table based on the set of multiplier tables. The network device may generate a resolution table based on the allocation table. The network device may provide, to another network device, network traffic via the set of member links based on the resolution table.

20 Claims, 10 Drawing Sheets

100 →

| Member Link | Capacity (Mbps) | Priority Indicator | Weight | Modified Weight |
|---|---|---|---|---|
| $M_1$ | 100 | 1 | 100 | 2 |
| $M_2$ | 100 | 2 | 200 | 4 |
| $M_3$ | 50 | 5 | 250 | 5 |
| $M_4$ | 70 | 5 | 350 | 7 |
| $M_5$ | 55 | 10 | 550 | 11 |

Network Device

110
Receive information associated with a set of member links, and determine a set of weight values for the set of member links

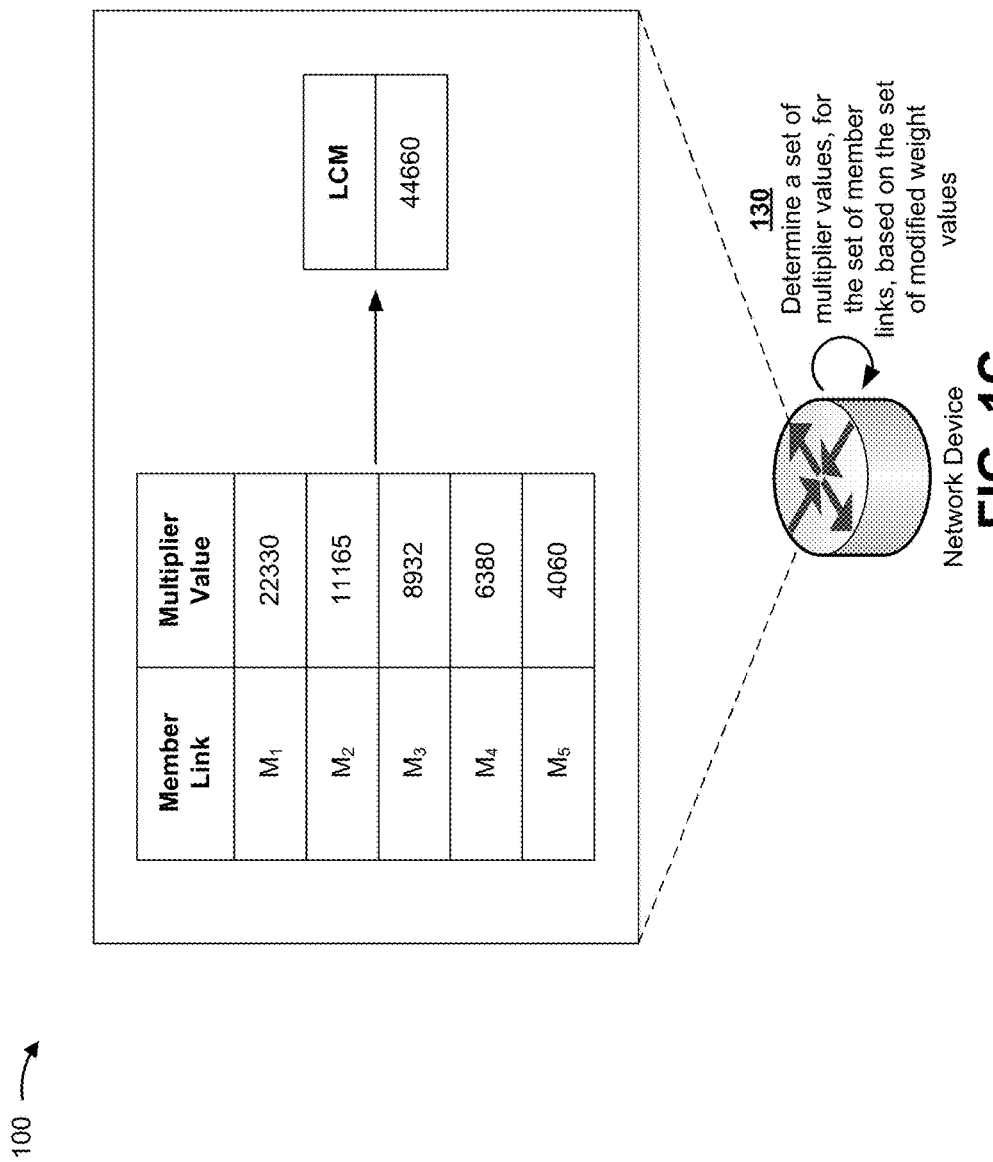

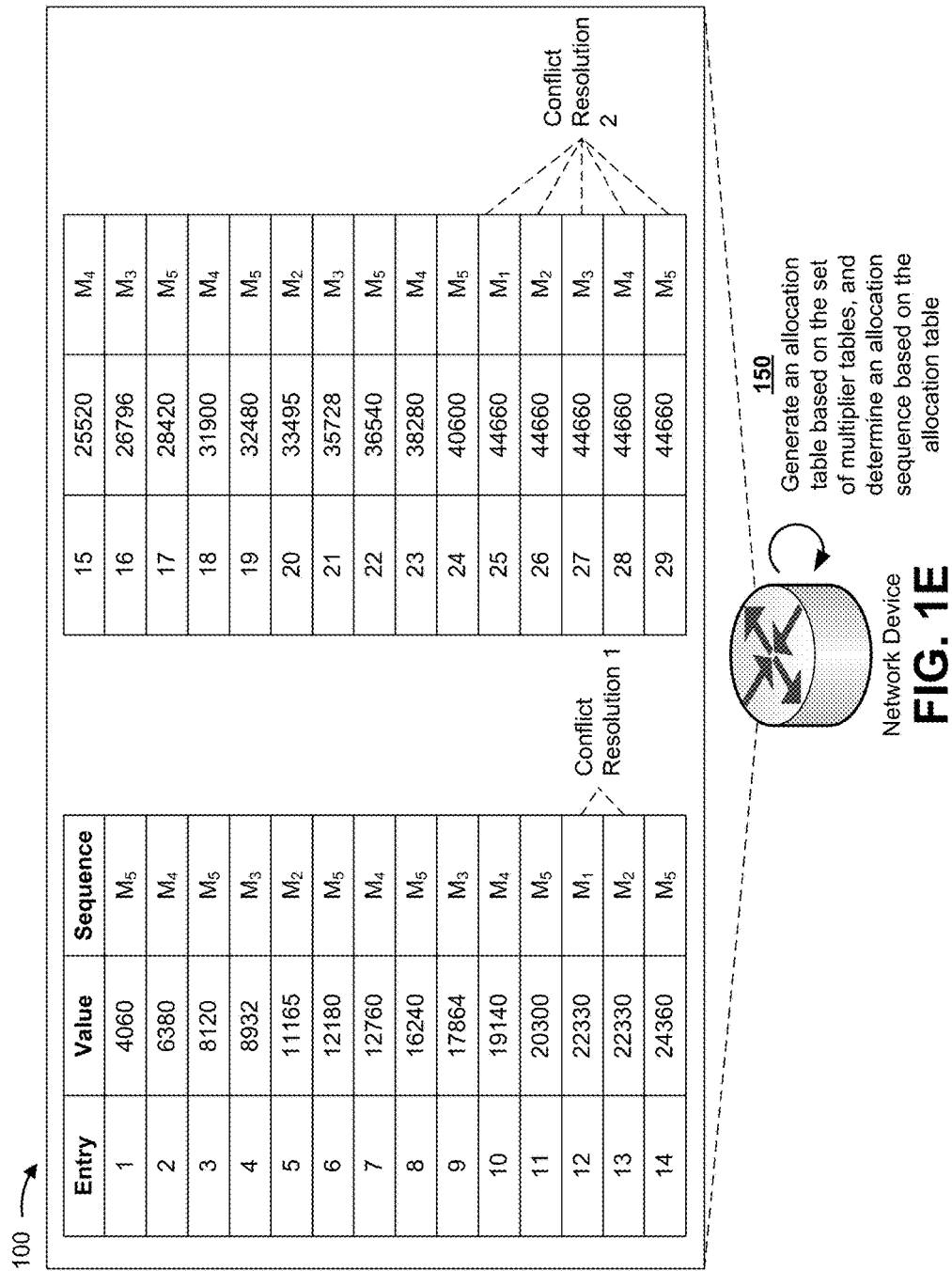

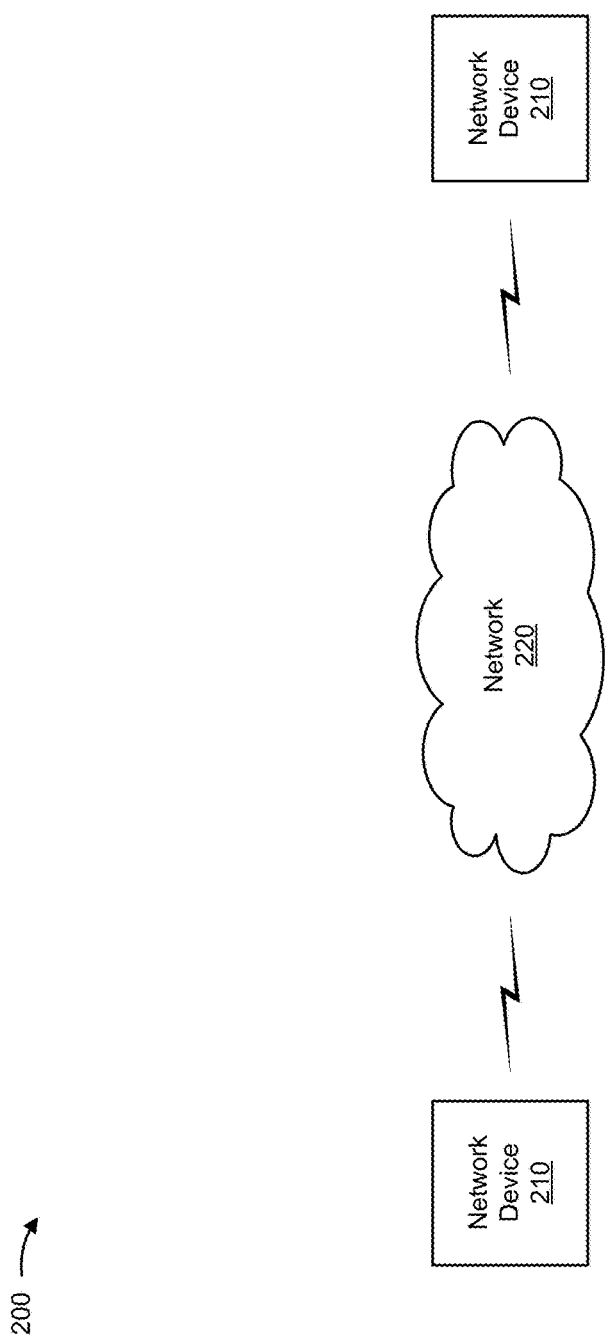

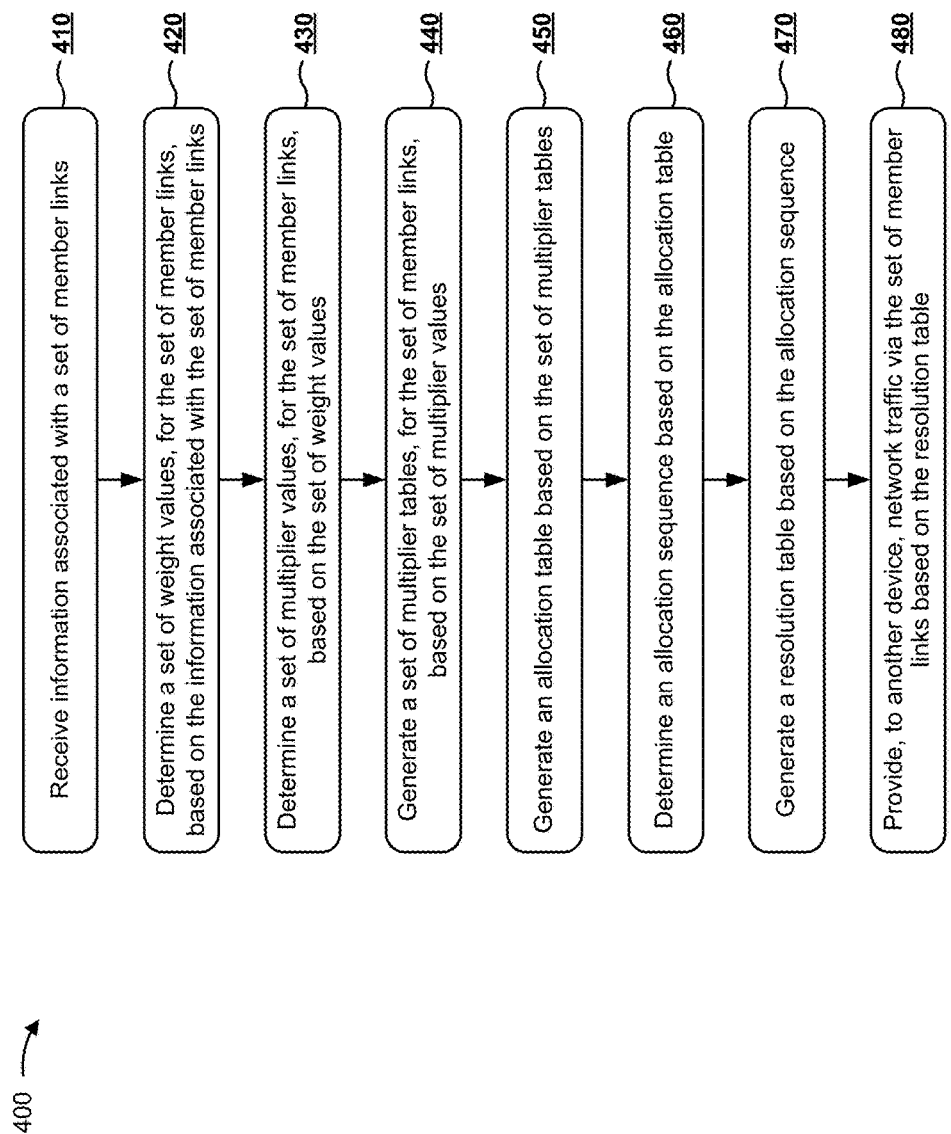

INTERLEAVING MEMBERS FOR PROPORTIONATE NETWORK TRAFFIC DISTRIBUTION

BACKGROUND

A network device (e.g., a router, a switch, a firewall, etc.) may provide network traffic to other network devices, via a particular output component, based on internal entries, a data structure, or the like. For example, the network device may receive network traffic, identify an entry based on the network traffic, and provide the network traffic to another network device via a particular output component based on the entry.

The Institute of Electrical Engineers (IEEE) 802.3ad standard describes link aggregation, which enables the grouping of Ethernet interfaces to form a single link layer interface known as a link aggregation group (LAG) or "bundle." Aggregating multiple links (e.g., member links) between physical interfaces creates a single logical point-to-point trunk link or a LAG. A LAG balances network traffic across the member links within an aggregated Ethernet bundle, thereby increasing bandwidth, availability, or the like.

While implementations herein describe configuring a resolution table of a LAG, it should be understood that implementations described herein are applicable to other types of configurations, such as configurations for scheduling network traffic, for transmission, in association with egress queues, and/or any other type of configuration where proportionate distribution and/or allocation of network traffic is desired.

SUMMARY

According to some possible implementations, a network device may include one or more processors to receive information associated with a set of member links of the network device. The one or more processors may determine a set of weight values, for the set of member links, based on the information associated with the set of member links. The one or more processors may determine a set of multiplier values, for the set of member links, based on the set of weight values. The one or more processors may generate a set of multiplier tables, for the set of member links, based on the set of multiplier values. The one or more processors may generate an allocation table based on the set of multiplier tables. The one or more processors may generate a resolution table based on the allocation table. The one or more processors may provide, to another network device, network traffic via the set of member links based on the resolution table.

According to some possible implementations, a non-transitory computer-readable medium may store one or more instructions that, when executed by one or more processors of a device, cause the one or more processors to receive information associated with a set of output components of the device. The one or more instructions may cause the one or more processors to determine a set of weight values, for the set of output components, based on the information associated with the set of output components. The one or more instructions may cause the one or more processors to determine a set of multiplier values, for the set of output components, based on the set of weight values. The one or more instructions may cause the one or more processors to generate a set of multiplier tables, for the set of output components, based on the set of multiplier values. The one or more instructions may cause the one or more processors to generate an allocation table based on the set of multiplier tables. The one or more instructions may cause the one or more processors to generate a resolution table based on the allocation table. The one or more instructions may cause the one or more processors to provide, to another device, network traffic via the set of output components based on the resolution table.

According to some possible implementations, a method may include receiving, by a device, information associated with a set of output components of the device. The method may include determining, by the device, a set of weight values, for the set of output components, based on the information associated with the set of output components. The method may include determining, by the device, a set of multiplier values, for the set of output components, based on the set of weight values. The method may include generating, by the device, a set of first tables for the set of output components. A first table, of the set of first tables, may include at least one multiplier value from the set of multiplier values. The method may include generating, by the device, a second table based on the set of first tables. The second table may include information from the set of first tables. The method may include generating, by the device, a third table based on information from the second table. The method may include providing, by the device and to another device, network traffic via the set of output components based on the third table.

BRIEF DESCRIPTION OF THE DRAWINGS

FIGS. 1A-1G are diagrams of an overview of an example implementation described herein;

FIG. 2 is a diagram of an example environment in which systems and/or methods, described herein, may be implemented;

FIG. 4 is a flow chart of an example process for interleaving resolution table entries for proportionate network traffic distribution.

DETAILED DESCRIPTION

Figure 1A:
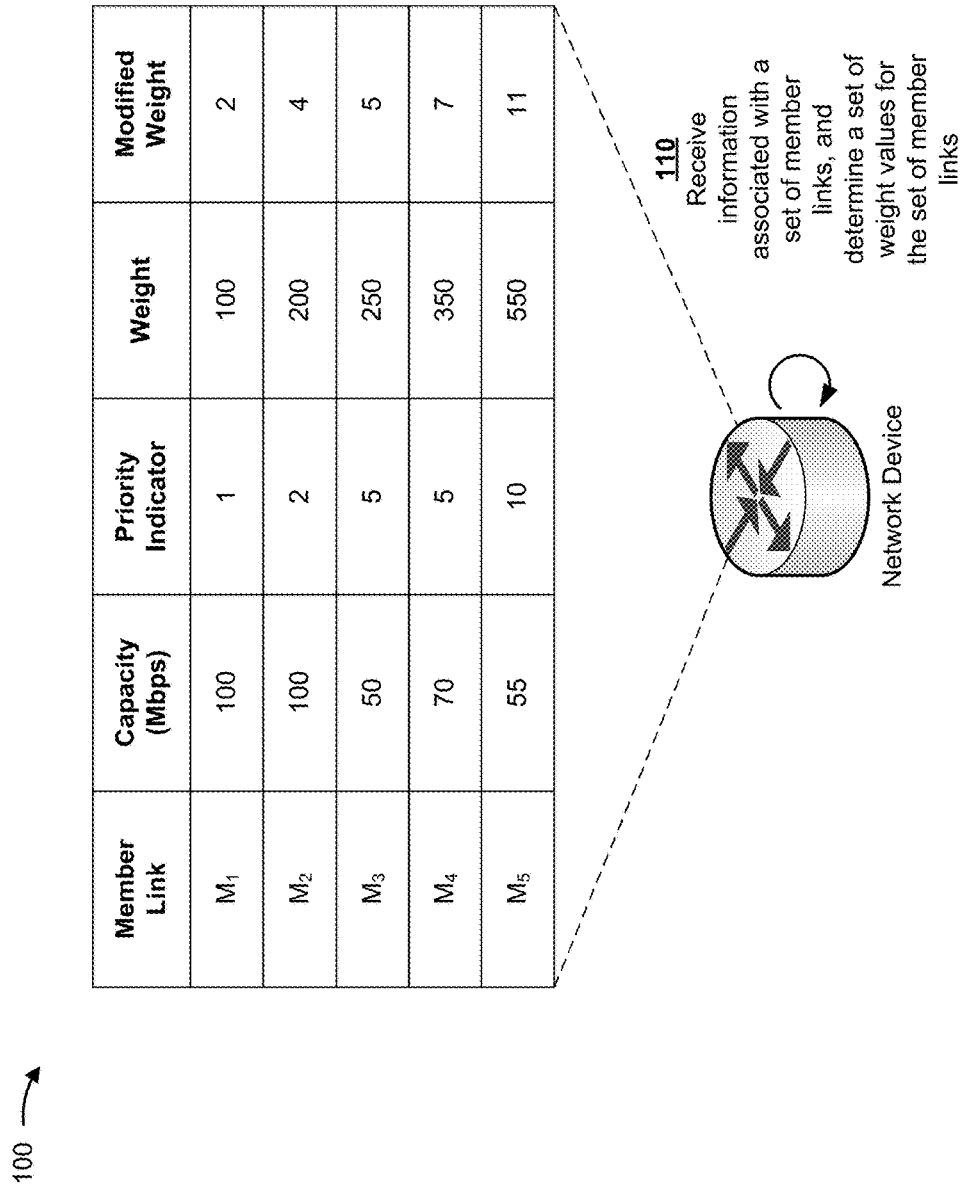

The following detailed description of example implementations refers to the accompanying drawings. The same reference numbers in different drawings may identify the same or similar elements.

A network device (e.g., a router, a switch, a firewall, or the like) may include an aggregated interface (e.g., a LAG) that includes multiple member links. The network device may provide, to other network devices, network traffic (e.g., packets) via particular member links. For example, the network device may receive a packet and implement a hashing technique using information associated with the packet (e.g., five-tuple information, such as a source address, a destination address, a source port identifier, a destination port identifier, and/or a protocol identifier). Additionally, the network device may identify an entry in a resolution table (e.g., a data structure) that corresponds to the hashed information, and distribute the packet to a particular member link, for transmission to another network device, based on the entry.

In some cases, the network device may interleave entries in the resolution table. That is, a first entry may correspond to a first member link, a second entry may correspond to a second member link, a third entry may correspond to a third member link, and so forth. Additionally, in some cases, a particular member link may be associated with a number of entries based on a configuration. For example, a first member link, that is configured to send twice the number of packets than as compared to a second member link, may be associated with twice the number of entries, in a resolution table, as compared to the second member link. Interleaving entries may refer to the process of programming entries in a resolution table such that a particular member link includes a particular number of entries, and such that the particular entries occur in a particular sequence.

However, in practice, ensuring a proportionate distribution, allocation, or the like, across member links is complex based on various factors, such as varying numbers of member links in particular LAGs, varying capacities (e.g., bandwidth capacities, or the like) of the member links, varying weights (e.g., identifying priorities of the member links), or the like. As such, a network device may provide network traffic to particular member links for transmission in an inefficient manner, in a disproportionate manner, in a manner that deviates from an intended configuration, or the like. Thereby, inefficient distribution techniques may decrease bandwidth, decrease throughput, increase latency, or the like. Thus, hardware resources of network devices may be consumed and/or network resources may be consumed.

Implementations described herein enable a network device to configure a resolution table, of the network device, such that the network device is capable of distributing network traffic to member links (or another type of output component) for transmission in a proportionate manner (e.g., in a manner that aligns with an intended configuration, in a manner that prevents starvation of a particular member link, or the like). In this way, the network device improves proportionate distribution of network traffic to member links for transmission, thereby increasing bandwidth of the LAG, reducing latency, improving resource utilization, or the like.

FIGS. 1A-1G are diagrams of an overview of an example implementation 100 described herein. As shown in FIG. 1A, and by reference number 110, a network device may receive information associated with a set of member links, and determine a set of weight values for the set of member links. In some implementations, the network device may configure a resolution table with entries that correspond to member links, such that proportionate distribution of network traffic to the member links is improved. For example, the network device may program entries in association with the resolution table such that entries, corresponding to member links, are interleaved in a particular sequence. That is, a first entry (e.g., that corresponds to a result of a hashing algorithm, such as a hash value) maps to a first member link, a second entry maps to a second member link, a third entry maps to a third member link, etc.

The information associated with the set of member links may include a member link identifier (e.g., $M_1$, $M_2$, $M_3$, $M_4$, and $M_5$), a capacity (e.g., 100 Megabits per second (Mbps), 100 Mbps, 50 Mbps, 70 Mbps, and 55 Mbps), a priority indicator (e.g., 1, 2, 5, 5, and 10), a weight value (e.g., 100, 200, 250, 350, and 550), and a modified weight value associated with each member link (e.g., 2, 4, 5, 7, and 11).

In some implementations, a capacity, of a member link, may refer to a data transfer rate capacity associated with the member link. In some implementations, a priority indicator, of a member link, may refer to a relative priority associated with the member link, and/or may refer to a relative number of packets that the member link may be configured to send as compared to another member link, or the like. That is, a first member link that includes a greater priority indicator than as compared to a second member link may send more packets than as compared to the second member link.

In some implementations, the network device may determine a weight value for a particular member link as a function of a capacity and a priority indicator value for the member link. A weight value may refer to a relative priority of a member link—similar to a priority indicator. As an example, the network device may determine a weight value of 200 for member link $M_2$ by multiplying the capacity of member link $M_2$ by the priority indicator for member link $M_2$ (e.g., 100×2=200). As another example, the network device may determine a weight value using a different type of function, such as a different type of mathematical operation.

In some implementations, the network device may determine a modified weight value for a particular member link as a function of a weight value and a highest common factor associated with the set of weight values. A highest common factor may include the largest positive integer that divides a particular set of weight values. As an example, the network device may determine a highest common factor of 50 for the set of weight values (e.g., 100, 200, 250, 350, and 550). Additionally, as an example, the network device may determine a modified weight value of 4 for the member link $M_2$ by dividing the weight value by the highest common factor (e.g., 200÷50=4). As another example, the network device may determine a modified weight value using a different type of function, such as a different type of mathematical operation.

Figure 1B:
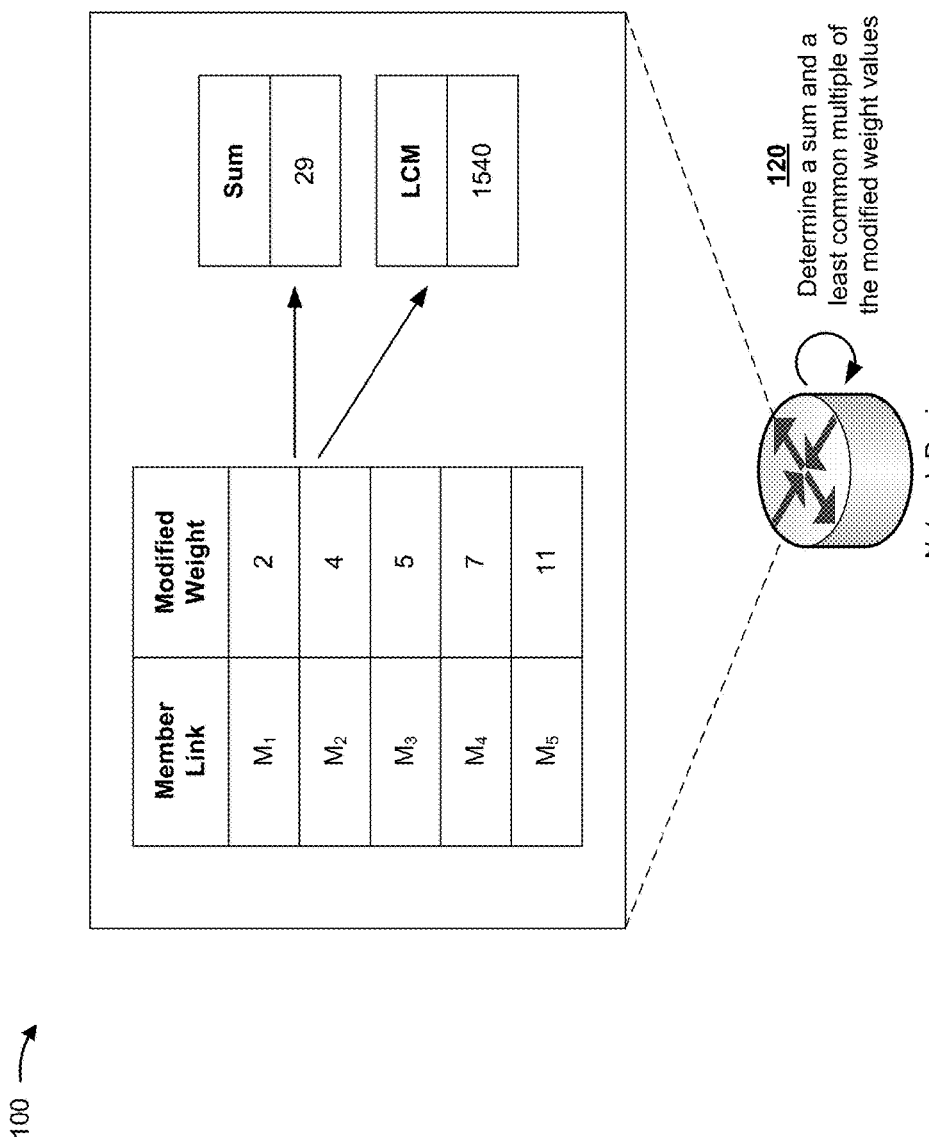

As shown in FIG. 1B, and by reference number 120, the network device may determine a sum and a least common multiple (LCM) of the modified weight values. An LCM of a particular set of modified weight values may include the smallest positive integer that is divisible by each modified weight value in the particular set of modified weight values. As an example, and as shown, the network device may determine a sum of 29 and an LCM of 1540 based on the set of modified weight values.

As shown in FIG. 1C, and by reference number 130, the network device may determine a set of multiplier values, for the set of member links, based on the set of modified weight values. In some implementations, the network device may determine a multiplier value as a function of the LCM value associated with the modified weight values, the sum of the modified weight values, and a modified weight value of a particular member link. A multiplier value may refer to a value that the network device may use when generating multiplier tables, as described elsewhere herein. As an example, the network device may determine a multiplier value of 22330 for the member link $M_1$ based on the LCM of the modified weight values, the sum of the modified weight values, and a modified weight value of the member link $M_1$ (e.g., (1540×29)÷2=22330). As another example, the network device may determine a multiplier value using a different type of function, such as a different type of mathematical operation.

Figure 1D:
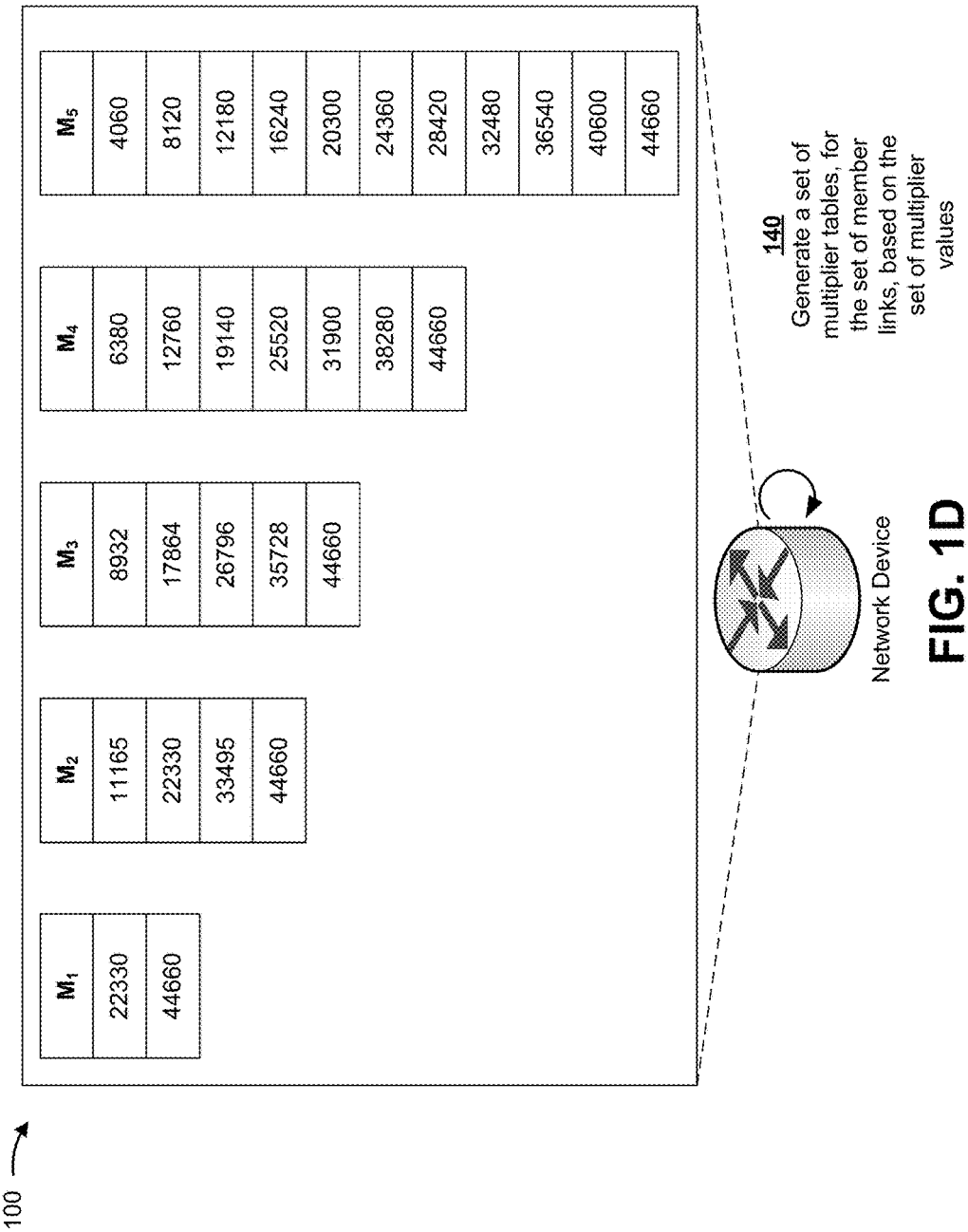

As shown in FIG. 1D, and by reference number 140, the network device may generate a set of multiplier tables, for the set of member links, based on the set of multiplier values. In some implementations, a particular multiplier table, that is associated with a particular member link, may include one or more entries that are populated based on a multiplier value of the particular member link. For example, for a multiplier table associated with a particular member link, the network device may populate a first entry with the multiplier value of the particular member link, populate a second entry with a value that is equal to the multiplier value multiplied by 2, populate a third entry with a multiplier value that is equal to the first multiplier value multiplied by 3, etc., until the LCM of the set of multiplier values is reached. As an example, and as shown in FIG. 1D, the network device may populate the multiplier table associated with member link $M_2$ with the multiplier value of 11165 as the first entry, the value of 22330 as the second entry, the value of 33495 as the third entry, and the LCM value of 44660 as the fourth entry.

As shown in FIG. 1E, and by reference number 150, the network device may generate an allocation table based on the set of multiplier tables, and determine an allocation sequence based on the allocation table. In some implementations, an allocation table may include a set of entries that are associated with multiplier table values and/or member links. In some implementations, the allocation table may include the multiplier table values, from respective multiplier tables, in ascending order. In some implementations, the allocation sequence may refer to an order of member links based on occurrence of entries in the allocation table. As an example, and as shown in FIG. 1E, the network device may determine an allocation sequence of $M_5$, $M_4$, $M_5$, $M_3$, $M_2$, $M_5$, $M_4$, etc.

As an example, and as shown in FIG. 1E, the first entry in the allocation table includes the value of 4060 (e.g., corresponding to member link $M_5$), the second entry includes the value of 6380 (e.g., corresponding to member link $M_4$), the third entry includes the value of 8120 (e.g., corresponding to member link $M_5$), the fourth entry includes the value of 8932 (e.g., corresponding to member link $M_3$), etc. That is, the network device may populate entries in the allocation table using values from respective multiplier tables of the member links.

In some implementations, such as situation where there are matching values in the allocation table, the network device may determine which member link includes the value sooner (e.g., includes the value as a lower entry in a respective multiplier table) and list that particular member link before another member link that includes the same value. For example, and as shown in FIG. 1E, entries 12 and 13 match (e.g., both include values of 22330). Additionally, the network device may determine that the multiplier table associated with member link $M_1$ includes the value of 22330 as a lower entry than as compared to the multiplier table associated with member link $M_2$. In this case, and as shown, the network device may populate, in the allocation table, an entry (e.g., entry 12) that corresponds to member link $M_1$ before an entry (e.g., entry 13) that corresponds to member link $M_2$. As further shown in FIG. 1E, the network device may perform another conflict resolution technique regarding entries 25-29 in a similar manner.

Figure 1F:
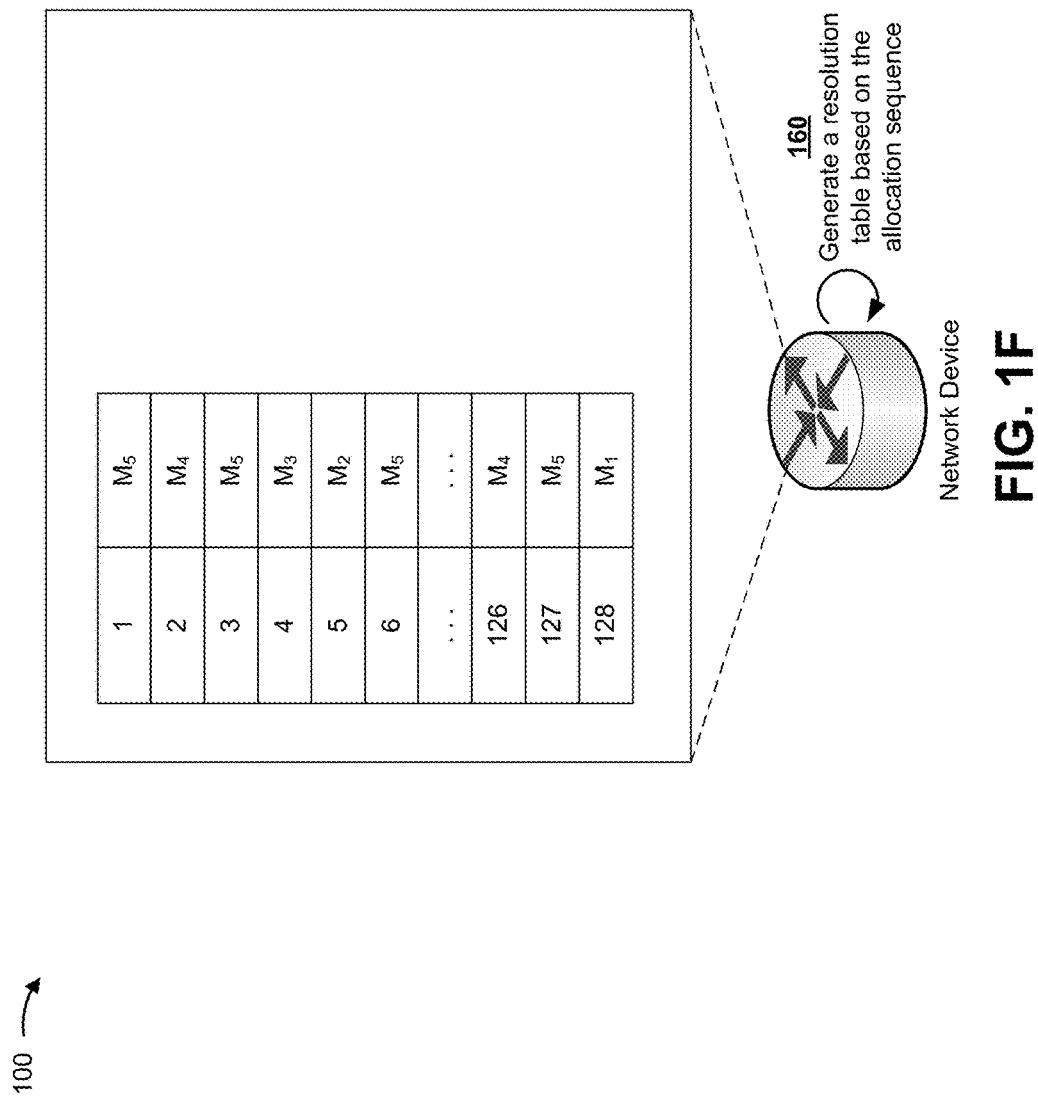

As shown in FIG. 1F, and by reference number 160, the network device may generate a resolution table based on the allocation sequence. In some implementations, the resolution table may include a data structure that includes entries that correspond to member links. In the resolution table, each entry may be mapped to a member link based on the allocation sequence. For example, as shown, the first entry may map to member link $M_5$, the second entry may map to member link $M_4$, the third entry may map to member link $M_5$, etc. As shown, the resolution table may include 128 entries, whereas the allocation table may include 29 entries (e.g., corresponding to the allocation sequence). In this case, the network device may generate the resolution table by repeating values associated with the allocation table.

Figure 1G:
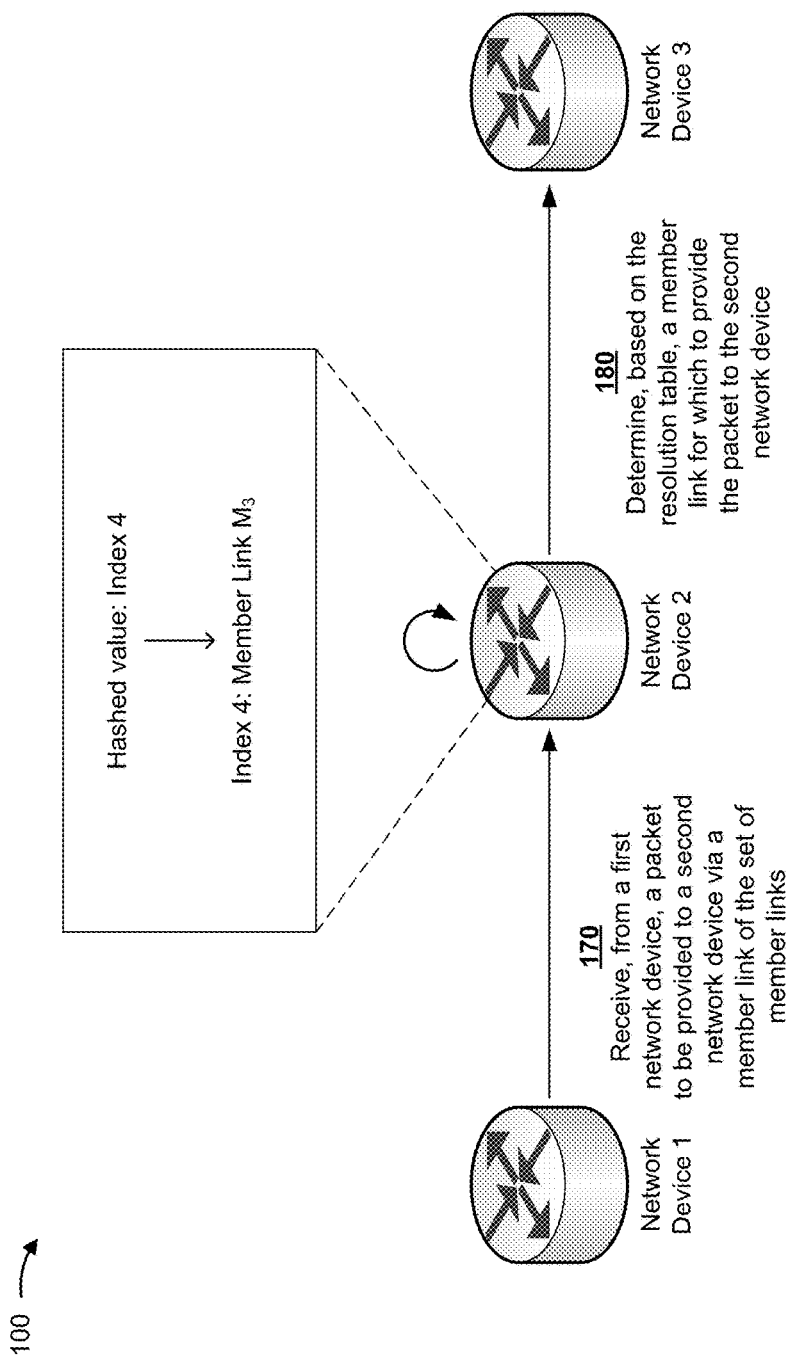

As shown in FIG. 1G, implementation 100 may include a network device 1, a network device 2, and a network device 3. Assume that network device 2 is the network device shown in example FIGS. 1A-1F. As shown by reference number 170, network device 2 may receive, from a first network device (e.g., from network device 1), a packet to be provided to a second network device (e.g., network device 3) via a member link of the set of member links.

In some implementations, network device 2 may perform a hashing technique (e.g., using a hashing algorithm) in association with information associated with the packet (e.g., may hash a five-tuple, or the like). For example, as shown by reference number 180, network device 2 may determine, based on the resolution table, a member link for which to provide the packet to the second network device. Network device 2 may identify an entry (e.g., Index 4), associated with the resolution table, that maps to the hashed information. Additionally, network device 2 may identify a member link (e.g., member link $M_3$) associated with the entry, and provide the packet for transmission, to network device 3, via member link $M_3$. In this way, network device 2 improves proportionate distribution of network traffic to member links for transmission. That is, the resolution table may include entries, that correspond to interleaved member links, that enable the network device to provide network traffic to member links in a manner that aligns with a configuration, that aligns with priority indicators of the member links, etc.

As indicated above, FIGS. 1A-1G are provided merely as an example. Other examples are possible and may differ from what was described with regard to FIGS. 1A-1G.

FIG. 2 is a diagram of an example environment 200 in which systems and/or methods, described herein, may be implemented. As shown in FIG. 2, environment 200 may include network devices 210 and a network 220. Devices of environment 200 may interconnect via wired connections, wireless connections, or a combination of wired and wireless connections.

Network device 210 includes a device (e.g., a traffic transfer device) capable of processing and transferring network traffic (e.g., packets). For example, network device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

As used herein, a packet may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network. As used herein, a flow may refer to a sequence of packets that share common information, such as five-tuple information (e.g., a source address, a destination address, a source port identifier, a destination port identifier, and a protocol identifier).

In some implementations, network device 210 may include connections for a number of links, such as optical cables or electrical cables, via which packets may be transmitted. A link may correspond to a logical or physical connection between network devices 210. In some implementations, network device 210 may include one or more ports for receiving incoming packets and/or transmitting outgoing packets. For example, a particular port may include an optical port into which an optical cable may be inserted. The optical cable may include a number of optical fibers, each of which may correspond to a link between network devices 210.

In some implementations, network devices 210 may be configured to implement an aggregated interface (e.g., link aggregation, port trunking, link bundling, Ethernet bonding, network interface controller (NIC) teaming, or the like). For example, a LAG may be configured between network devices 210 to form a single link layer interface. Additionally, the LAG may include a plurality of member links. As a particular example, a first network device 210 (e.g., a provider edge (PE) device) and a second network device 210 (e.g., a customer edge (CE) device) may include a set of links (e.g., member links) that may be aggregated to form a LAG. The LAG may increase bandwidth, and provide fault tolerance in the event of a failure of one of the member links.

In some implementations, network device 210 may include a resolution table (e.g., a table, a hash table, a flow table, or the like) that includes a set of entries that correspond to a set of member links. In some implementations, network device 210 may receive a packet, implement a hashing technique, and distribute the packet to a particular member link, for transmission to another network device 210, based on the hashing technique. In some implementations, network device 210 may perform a hashing operation using information associated with the packet (e.g., a five-tuple, or the like), and identify an entry in the resolution table that corresponds to the hashed information. Additionally, network device 210 may identify a member link, on which to transmit the packet, based on the entry.

Network 220 includes one or more wired and/or wireless networks. For example, network 220 may include a cellular network (e.g., a fifth generation (5G) network, a long-term evolution (LTE) network, a code division multiple access (CDMA) network, a third generation (3G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
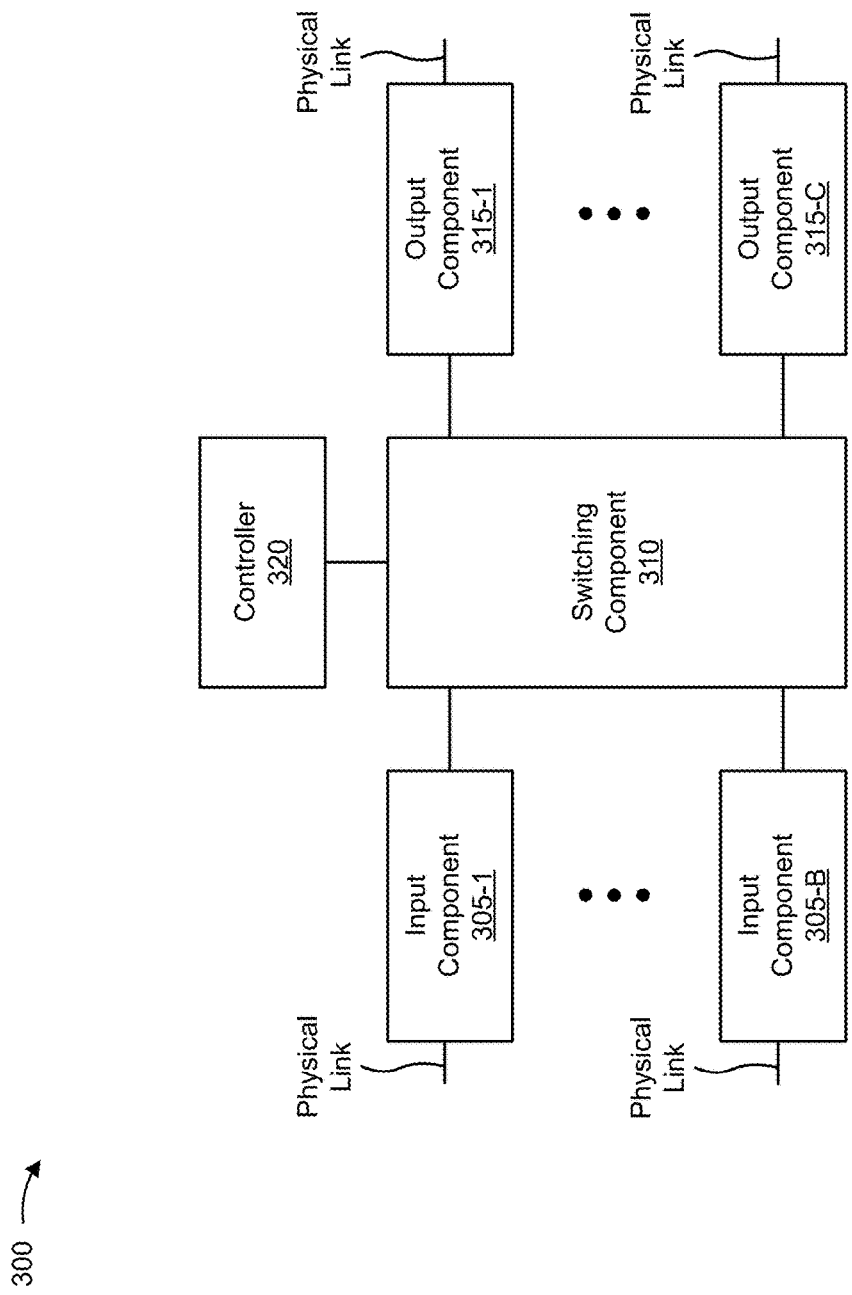
FIG. 3 is a diagram of example components of one or more devices of FIG. 2.

FIG. 3 is a diagram of example components of a device 300. Device 300 may correspond to network device 210. In some implementations, network device 210 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for interleaving resolution table entries for proportionate network traffic distribution. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include receiving information associated with a set of member links (block 410), and determining a set of weight values, for the set of member links, based on the information associated with the set of member links (block 420). For example, network device 210 may receive information associated with a set of member links, and determine a set of weight values for the set of member links based on the information associated with the set of member links.

As described in connection with FIG. 2, network device 210 may be configured with a LAG which includes a plurality of member links. In some implementations, network device 210 may be configured with the information associated with the set of member links, and/or may receive the information from another device (e.g., based on an input from a network operator).

In some implementations, the information associated with the set of member links may include information that identifies capacities of each link of the set of member links. For example, a capacity may refer to a data transfer rate capacity. As an example, a capacity may refer to a number of bits per unit time that a member link is capable of carrying (e.g., megabits per second (Mbps), gigabits per second (Gbps), etc.) Additionally, or alternatively, a capacity may refer to and/or be based on another type of network metric value associated with a member link, such as a bandwidth value, a throughput value, a goodput value, a latency value, a jitter value, or the like.

In some implementations, the information associated with the set of member links may include a priority indicator. For example, a priority indicator may refer to a relative priority of a member link within the set of member links and/or may refer to a relative number of packets that a member link may send as compared to another member link. As an example, a first member link that includes a first priority indicator having a value that is twice a value of a second priority indicator of a second member link may send twice the number of packets as the second member link.

In some implementations, network device 210 may determine a set of weight values for the set of member links based on the information associated with the set of member links. For example, network device 210 may determine a weight value for a member link as a function of a capacity and a priority indicator associated with the member link. As a particular example, network device 210 may multiply the capacity and the priority indicator to determine a weight value. Continuing with the example, assume that a member link includes a capacity of 100 Mbps and includes a priority indicator value of 2. In this case, the member link may be associated with a weight value of 200 (e.g., 100×2=200).

In some implementations, network device 210 may determine a set of modified weight values based on the set of weight values. Additionally, or alternatively, network device 210 may determine a highest common factor (e.g., a greatest common factor, a greatest common divisor, etc.) based on the set of weight values, and determine a set of modified weight values based on the highest common factor (e.g., may divide each weight value by the highest common factor, or the like). In some implementations, the highest common factor may include the greatest positive integer that divides a set of numbers without a remainder. As an example, assume that the set of weight values includes the following values: 100, 200, 250, 350, and 550. In this case, the highest common factor may include 50 (because 50 is the largest number that divides into all of the weight values without a remainder), and the set of modified weight values may include the following values: 2 (i.e., 100÷50=2), 4 (i.e., 200÷50=4), 5 (i.e., 250÷50=5), 7 (i.e., 350÷50=7), and 11 (i.e., 550÷50=11).

As further shown in FIG. 4, process 400 may include determining a set of multiplier values, for the set of member links, based on the set of weight values (block 430), and generating a set of multiplier tables, for the set of member links, based on the set of multiplier values (block 440). For example, network device 210 may determine a set of multiplier values for the set of member links based on the set of weight values, and generate a set of multiplier tables for the set of member links based on the set of multiplier values. In some implementations, a multiplier table may refer to a data structure that stores values that are generated based on multiplier values, and that are used to generate an allocation table, as described elsewhere herein.

In some implementations, network device 210 may determine, for a member link, a multiplier value based on a least common multiple of the set of weight values (i.e., the smallest positive integer that is divisible by each weight value), a weight value associated with the member link, and a sum of the weight values. As an example, assume that the set of weight values (e.g., the set of modified weight values) includes the following values: 2, 4, 5, 7, and 11. In this case, the least common multiple of the set of weight values may include the value of 1540.

In some implementations, network device 210 may determine a multiplier value for a member link as a function of the least common multiple of the set of weight values, the sum of the weight values, and a particular weight value of the member link. For example, network device 210 may determine a multiplier value for a member link by dividing the product of the least common multiple and the sum of the weight values by the particular weight value of the member link. As an example, for a member link that includes the weight value of 2, a least common multiple of 1540, and a sum of weight values of 29, network device 210 may determine a multiplier value of 22330 (e.g., (1540×29)÷2=22330).

In some implementations, network device 210 may determine a set of multiplier values, and determine a least common multiple of the set of multiplier values. For example, assume that the set of multiplier values includes the following values: 22330, 11165, 8932, 6380, and 4060. In this case, network device 210 may determine a least common multiple value of 44660.

In some implementations, network device 210 may generate a multiplier table for a member link based on the multiplier value of the member link and the least common multiple of the set of multiplier values. For example, network device 210 may generate, based on the multiplier value, a set of values to populate a multiplier table (e.g., $MT_1, \ldots, MT_n$). As an example, the value ($MT_1$) may include the multiplier value of a particular member link, and the value ($MT_n$) may include the multiplier value multiplied by n where n≥1. Additionally, or alternatively, the value ($MT_n$) may be equal to the least common multiple of the set of multiplier values. As a particular example, for the member link that includes the multiplier value of 8932, network device 210 may generate a multiplier table that includes the following values: 8932 (i.e., 8932×1), 17864 (i.e., 8932×2), 26796 (i.e., 8932×3), 35728 (i.e., 8932×4), 44660 (i.e., the least common multiple). In some implementations, network device 210 may generate multiplier table values by iteratively performing a mathematical operation, using the multiplier value, until a result is greater than (or equal to) the least common multiple.

As further shown in FIG. 4, process 400 may include generating an allocation table based on the set of multiplier tables (block 450), and determining an allocation sequence based on the allocation table (block 460). For example, network device 210 may generate an allocation table based on the set of multiplier tables, and determine an allocation sequence based on the allocation table. In some implementations, an allocation table may include a data structure that includes a set of values that are mapped to member links. For example, network device 210 may generate an allocation table based on values associated with the set of multiplier tables.

As a particular example, network device 210 may generate an allocation table that lists values from respective multiplier tables in ascending order. In other words, the first entry of the allocation table may include the lowest value that is included in a multiplier table, the second entry of the allocation table may include the second lowest value that is included in a multiplier table, etc. As a particular example, assume that network device 210 generates two multiplier tables for two member links (e.g., member link $M_1$ and member link $M_2$). Continuing the example, assume that the first multiplier table includes the values of 22330 and 44660. Additionally, assume that the second multiplier table includes the following values: 11165, 22330, 33495, and 44660. In this case, network device 210 may generate the following allocation table:

| Value | Member Link |
|---|---|
| 11165 | $M_2$ |
| 22330 | $M_1$ |
| 22330 | $M_2$ |
| 33495 | $M_2$ |

-continued

| Value | Member Link |
|---|---|
| 44660 | $M_1$ |
| 44660 | $M_2$ |

As shown in the allocation table above, network device 210 may list the multiplier values in ascending order.

In some implementations, network device 210 may perform a conflict resolution technique. For example, in situations where network device 210 determines that there are multiple values that are equal, then network device 210 may list the values in a particular order based on where the values occur in respective multiplier tables. As an example, and referring to the example allocation table shown above, for the particular value of 22330, network device 210 may determine that the multiplier table for member link $M_1$ includes the particular value as a lower entry than as compared to the multiplier table for member link $M_2$. In other words, the multiplier table for member link $M_1$ includes the particular value of 22330 as the first entry, whereas the multiplier table for member link $M_2$ includes the same particular value as the second entry. In this case, network device 210 may populate, in the allocation table, an entry for the value that corresponds to member link $M_1$ before the entry that corresponds to member link $M_2$.

In some implementations, network device 210 may determine an allocation sequence based on the allocation table. For example, an allocation sequence may refer to a sequence in which entries, for particular member links, may occur in a resolution table, as described elsewhere herein. In some implementations, network device 210 may determine the allocation sequence based on entries associated with the allocation table. As a particular example, and referring to the example allocation table shown above, network device 210 may determine the following allocation sequence: ($M_2$, $M_1$, $M_2$, $M_2$, $M_1$, and $M_2$). In some implementations, the allocation table may include a particular number of entries based on the number of values associated with the set of multiplier tables. For example, the total number of entries, of the set of multiplier tables, may correspond to the number of entries in the allocation table.

As further shown in FIG. 4, process 400 may include generating a resolution table based on the allocation sequence (block 470). For example, network device 210 may generate a resolution table based on the allocation sequence. In some implementations, a resolution table may include a data structure that includes entries that map values (e.g., determined based on an algorithm) and member links. Additionally, the resolution table may include entries that are associated with the allocation sequence (e.g., the entries for the member links are interleaved). In some implementations, network device 210 may use an algorithm (e.g., a hashing algorithm, or the like) in association with a packet, determine a value based on the algorithm, and identify a member link that maps to the value based on the resolution table, as described elsewhere herein.

Additionally, or alternatively, the resolution table may include a particular number of entries. For example, network device 210 may be configured with a particular number of entries to be used in association with the allocation table. In some implementations, the particular number of entries of the resolution table may be different than the number of entries of the allocation table. For example, in situations where the number of entries associated with the allocation table is less than the number of entries to be used in association with the resolution table, network device 210 may generate the resolution table based on using entries associated with the allocation table multiple times. As a particular example, assume that the allocation table includes 29 entries, and that the resolution table is to include 128 entries. In this case, network device 210 may generate the resolution table such that the first 29 entries correspond to the allocation sequence, the next 29 entries correspond to the allocation sequence, the next 29 entries correspond to the allocation sequence, the next 29 entries correspond to the allocation sequence, and the next 12 entries correspond to the first 12 entries of the allocation sequence. In this way, network device 210 improves proportionate distribution of network traffic to member links for transmission in such a case where the number of entries in a resolution table does not match a number of entries in the allocation table or allocation sequence.

As further shown in FIG. 4, process 400 may include providing, to another device, network traffic via the set of member links based on the resolution table (block 480). For example, network device 210 may provide, to another device, network traffic via the set of member links based on the resolution table. In some implementations, network device 210 may receive a packet, and perform a hashing technique (e.g., using a hashing algorithm) in association with information associated with the packet (e.g., may hash the five-tuple, may hash other information associated with the packet, or the like). Additionally, or alternatively, network device 210 may identify an entry, associated with the resolution table, that maps to the hashed information. Additionally, or alternatively, network device 210 may identify a member link associated with the entry, and provide the packet for transmission to another device via the member link.

In this way, network device 210 may distribute network traffic to particular member links in a manner that aligns more accurately with a configuration of network device 210. As an example, assume that five member links include respective weight values of 100, 200, 250, 350, and 550. In this case, the first member link may be configured to receive and/or provide approximately 7% of network traffic (e.g., 100÷1450=0.069), the second member link may be configured to receive approximately 14% of the network traffic (e.g., 200÷1450=0.138), etc. By configuring the resolution table in a manner described herein, network device 210 may distribute network traffic to particular member links such that network traffic is distributed to member links in a manner that more accurately aligns with a desired configuration, in a manner that distributes network traffic more proportionately across member links, etc. than as compared to other techniques. In this way, implementations described herein improve throughput, decrease latency, more efficiently utilize resources, or the like.

Additionally, network device 210 may configure the resolution table such that the distribution of network traffic more closely aligns with an intended configuration regardless of the number of entries in the resolution table. As an example, and referring back to FIG. 1E, network device 210 may use an allocation sequence when generating the resolution table. Additionally, as an example, member link $M_1$ may be associated with a configured allocation percentage of 7% of network traffic (e.g., 100÷1450=0.069). In situations where the resolution table includes 128 entries, member link $M_1$ may be associated with 9 of the 128 entries, and be programmed to receive approximately 7% of network traffic (e.g., 9÷128=0.0703). In situations where the resolution table includes 512 entries, member link $M_1$ may be associated with 35 of the 512 entries, and be programmed to receive approximately 7% of network traffic (e.g., 35÷512=0.0683). In this way, network device 210 may generate resolution tables, with varying numbers of entries, that align with a configured allocation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As described above, implementations described herein enable a network device to configure a resolution table of the network device, such that the network device is capable of distributing network traffic to member links (or another type of output component) for transmission in a proportionate manner. In this way, the network device improves proportionate distribution of network traffic to member links for transmission. Further, the network device improves proportionate distribution of network traffic to member links for transmission in cases where a number of entries in a resolution table does not match a number of entries in an allocation table or allocation sequence.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors, communicatively coupled to the one or more memories, to:
receive information associated with a set of member links of the network device;
determine a set of weight values, for the set of member links, based on the information associated with the set of member links;
determine a set of multiplier values, for the set of member links, based on the set of weight values;
generate a set of multiplier tables, for the set of member links, based on the set of multiplier values;
generate an allocation table based on the set of multiplier tables;
generate a resolution table based on the allocation table;
identify an entry, in the resolution table, that corresponds to network traffic and a first member link, of the set of member links; and
provide, to another network device, the network traffic via the first member link, of the set of member links, based on the resolution table.

2. The network device of claim 1, where the one or more processors are further to:
identify a set of capacities, associated with the set of member links, based on the information associated with the set of member links;
identify a set of priority indicators, associated with the set of member links, based on the information associated with the set of member links; and
where the one or more processors, when determining the set of weight values, are to:
determine the set of weight values based on the set of capacities and the set of priority indicators.

3. The network device of claim 1, where the one or more processors are further to:
determine, for the first member link of the set of member links, a first multiplier value based on a first weight value associated with the first member link, a sum of the set of weight values, and a least common multiple of the set of weight values; and
generate, for the first member link, a first multiplier table based on the first multiplier value,
the first multiplier table including a set of entries that correspond to the first multiplier value.

4. The network device of claim 1, where the one or more processors are further to:
identify a set of values associated with the set of multiplier tables;
arrange the set of values in an ascending order; and
determine an allocation sequence based on the set of values being in the ascending order,
the resolution table being generated based on the allocation sequence.

5. The network device of claim 1, where the one or more processors are further to:
determine an allocation sequence based on the allocation table; and
where the one or more processors, when generating the resolution table, are to:
generate the resolution table based on the allocation sequence.

6. The network device of claim 1, where the one or more processors are further to:
determine a common multiple of the set of multiplier values; and
where the one or more processors, when generating the set of multiplier tables, are to:
generate the set of multiplier tables based on the common multiple.

7. The network device of claim 1, where the one or more processors are further to:
receive the network traffic;
perform a hashing technique based on the network traffic; and
identify the entry in the resolution table based on performing the hashing technique.

8. A non-transitory computer-readable medium storing instructions, the instructions comprising:
one or more instructions that, when executed by one or more processors of a device, cause the one or more processors to:
receive information associated with a set of output components of the device;
determine a set of weight values, for the set of output components, based on the information associated with the set of output components;
determine a set of multiplier values, for the set of output components, based on the set of weight values;
generate a set of multiplier tables, for the set of output components, based on the set of multiplier values;
generate an allocation table based on the set of multiplier tables;
determine an allocation sequence based on the allocation table;
generate a resolution table based on the allocation sequence; and
provide, to another device, network traffic via the set of output components based on the resolution table.

9. The non-transitory computer-readable medium of claim 8, where the one or more instructions, when executed by the one or more processors, further cause the one or more processors to:
identify a set of capacities associated with the set of output components; and
where the one or more instructions, that cause the one or more processors to determine the set of weight values, cause the one or more processors to:
determine the set of weight values based on the set of capacities.

10. The non-transitory computer-readable medium of claim 8, where the one or more instructions, when executed by the one or more processors, further cause the one or more processors to:
receive the network traffic;
perform a hashing technique based on the network traffic;
identify an entry in the resolution table based on performing the hashing technique; and
where the one or more instructions, that cause the one or more processors to provide the network traffic, via the set of output components based on the resolution table, cause the one or more processors to:
provide the network traffic based on the entry.

11. The non-transitory computer-readable medium of claim 8, where the one or more instructions, when executed by the one or more processors, further cause the one or more processors to:
identify a first number of entries to be generated in association with the resolution table, the first number of entries being different than a second number of entries associated with the allocation table; and where the one or more instructions, that cause the one or more processors to generate the resolution table, cause the one or more processors to:

generate the resolution table to include the first number of entries.

12. The non-transitory computer-readable medium of claim 8, where the one or more instructions, when executed by the one or more processors, further cause the one or more processors to:

determine a common multiple based on the set of multiplier values; and where the one or more instructions, that cause the one or more processors to generate the set of multiplier tables, cause the one or more processors to:

generate the set of multiplier tables based on the common multiple.

13. The non-transitory computer-readable medium of claim 8, where the set of output components include a set of member links associated with a link aggregation group.

14. The non-transitory computer-readable medium of claim 8, where the one or more instructions, when executed by the one or more processors, further cause the one or more processors to:

identify an entry, in the resolution table, that corresponds to the network traffic and a first component of the set of output components; and where the one or more instructions, that cause the one or more processors to provide the network traffic, cause the one or more processors to:

provide, to the other device, the network traffic via the first component, of the set of output components.

15. A method, comprising:

receiving, by a device, information associated with a set of output components of the device;

identifying, by the device, a set of priority indicators associated with the set of output components;

determining, by the device, a set of weight values, for the set of output components, based on the set of priority indicators and the information associated with the set of output components;

determining, by the device, a set of multiplier values, for the set of output components, based on the set of weight values;

generating, by the device, a set of first tables for the set of output components, a first table, of the set of first tables, including at least one multiplier value from the set of multiplier values;

generating, by the device, a second table based on the set of first tables, the second table including information from the set of first tables;

generating, by the device, a third table based on information from the second table; and providing, by the device and to another device, network traffic via the set of output components based on the third table.

16. The method of claim 15, where the set of output components are associated with a link aggregation group.

17. The method of claim 15, further comprising:

identifying a set of bit rate capacities associated with the set of output components; and where determining the set of weight values comprises:

determining the set of weight values based on the set of bit rate capacities.

18. The method of claim 15, further comprising:

receiving the network traffic;

determining a hash value based on the network traffic and a hashing algorithm; and where providing the network traffic, via the set of output components based on the third table, comprises:

providing the network traffic via a first output component, of the set of output components, based on the hash value, the hash value being mapped to the first output component.

19. The method of claim 15, further comprising:

determining an allocation sequence based on the second table; and where generating the third table comprises:

generating the third table based on the allocation sequence.

20. The method of claim 15, further comprising:

identifying an entry, in the third table, that corresponds to the network traffic and a first component of the set of output components; and where providing the network traffic comprises:

providing, to the other device, the network traffic via the first component, of the set of output components.

* * * * *